United States Patent [19]

Levine et al.

[11] 3,911,467

[45] Oct. 7, 1975

[54] INTERLACED READOUT OF CHARGE STORED IN CHARGE-COUPLED IMAGE SENSING ARRAY

[75] Inventors: Peter Alan Levine, Kendall Park; James Edward Carnes, Cranbury, both of N.J.

[73] Assignee: RCA Corporation, New York, N.Y.

[22] Filed: July 25, 1974

[21] Appl. No.: 491,836

[52] U.S. Cl. .................................... 357/24; 357/30
[51] Int. Cl.$^2$ ........................................ H01L 29/78
[58] Field of Search .................. 357/24; 307/221 D; 250/553; 178/7.7, 7.1; 358/41

[56] References Cited

UNITED STATES PATENTS 3,801,844 4/1974 Sequin ................................ 357/24

OTHER PUBLICATIONS

"Interlacing in Charge-Coupled Imaging Devices;" IEEE Transactions, Carlo Sequin, Vol. Ed.–20, No. 6, June 1973, pp. 535–539.

*Primary Examiner*—Robert L. Griffin
*Assistant Examiner*—R. John Godfrey
*Attorney, Agent, or Firm*—H. Christoffersen; S. Cohen

[57] ABSTRACT

Horizontal interlacing of charge patterns read from an image sensing array is achieved by combining the charge signals read from each I'th and (I + 1'th) column during alternate field times and combining the charge signals read from each I'th and (I −1'th) column during the remaining field times.

10 Claims, 23 Drawing Figures

LEGEND FOR FIGS 13a-13f:

o o = VERT. FIELD 1

X X = VERT. FIELD 2

LEGEND FOR FIGS 13g AND 13h:

| FIELD | | | |
|---|---|---|---|
| 1 | 2 | 3 | 4 |
| o o | X X | O O | + + |

INTERLACED READOUT OF CHARGE STORED IN CHARGE-COUPLED IMAGE SENSING ARRAY

The article, "Interlacing in Charge-Coupled Imaging Devices," by C. H. Sequin, in IEEE Trans. Electron Devices, Vol. ED-20, No. 6, June 1973, p. 535, describes vertical interlacing of the information read from a charge-coupled image sensing system. The advantage of vertical interlacing is a substantial increase in the vertical resolution and a drastic reduction in Moire pattern effects.

The present invention deals with a method and apparatus for horizontally interlacing charge patterns, which may be vertically interlaced patterns. This increases the horizontal resolution and reduces the production of Moire patterns.

The invention is illustrated in the drawing of which:

FIG. 1 is a schematic showing of a known charge-coupled device (CCD) image sensing system;

FIGS. 2*a* and 2*b* show schematically a known method for vertically interlacing the charge signals produced by the photosensing array of FIG. 1;

FIG. 3 is a more realistic showing, in vertical cross section, of the electrodes which may be employed in the system of FIG. 1 and a showing also of the surface potential profiles obtained during different integration fields;

FIGS. 4*a* and 4*b* show schematically one embodiment of the present invention for obtaining vertically and horizontally interlaced charge patterns;

FIGS. 5*a* and 5*b* show schematically a second embodiment of the present invention for obtaining horizontal and vertical interlacing;

Figure 1:
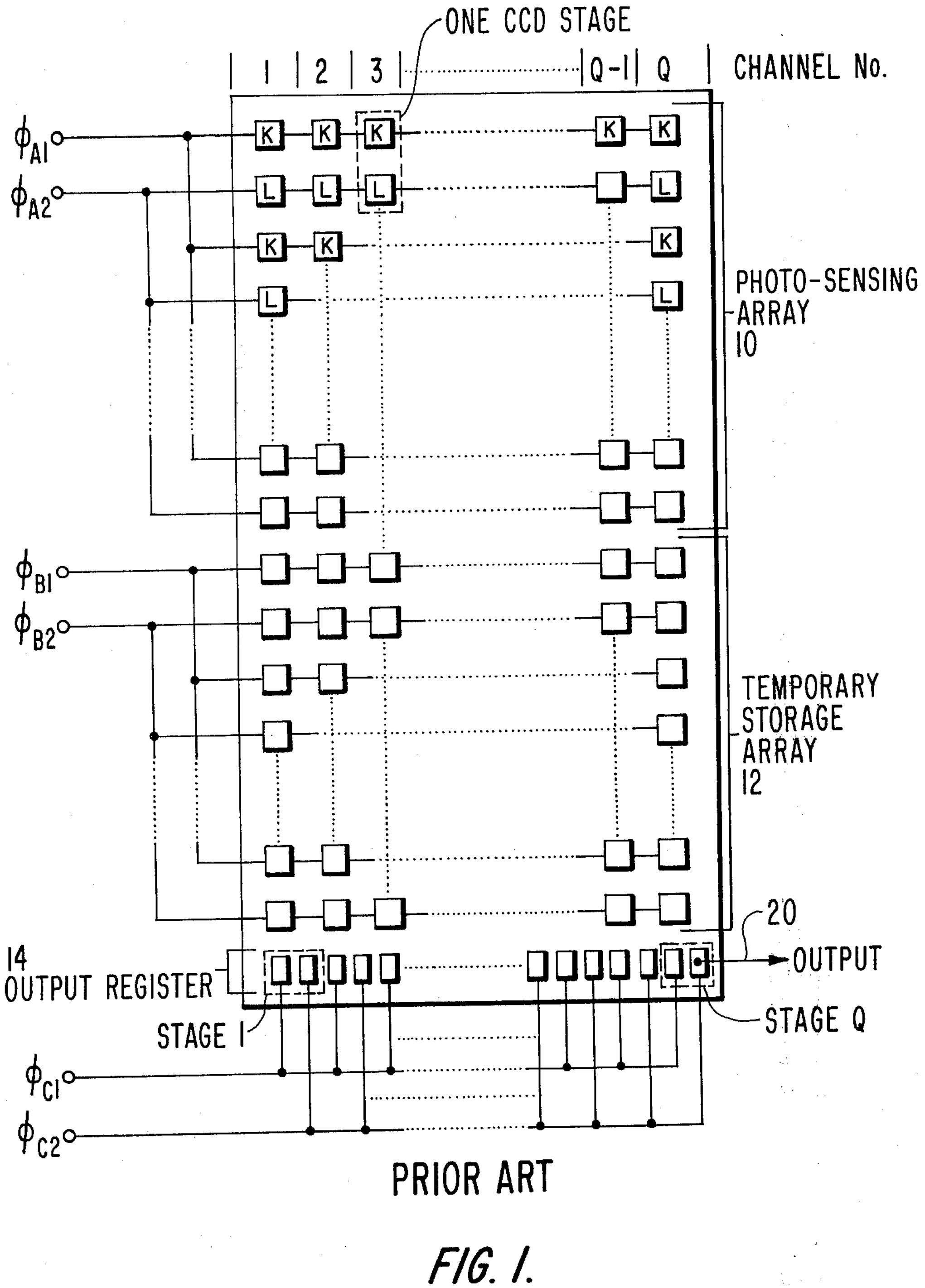
Figure 3:
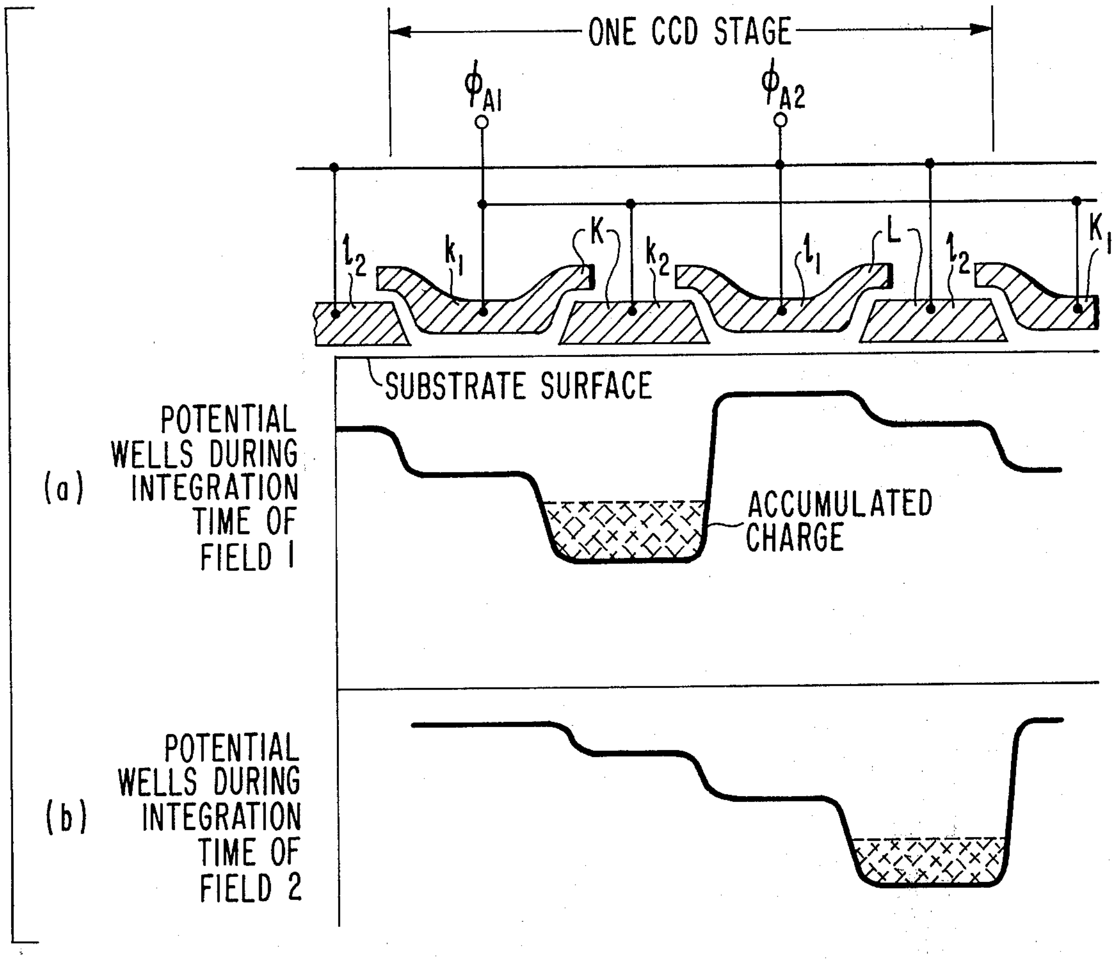

The known system of FIG. 1 includes a photosensing array 10, a temporary storage array 12 having the same number of locations as the array 10, and an output register 14 having a number of stages equal to the number of columns in the arrays 10 and 12. Elements 10, 12 and 14 are sometimes known as the A, B and C registers, respectively. Each stage or location comprises two electrode means K and L. FIG. 3 is a view of the electrodes of a stage in cross-section as seen looking from the left side thereof in FIG. 1. As shown in FIG. 3, an electrode means such as K may, in a two phase system, comprise a pair of electrodes $k_1$ and $k_2$. Electrode $k_2$ preferably is formed of polysilicon and $k_1$ of aluminum and both are driven by the same voltage phase $\phi_{A1}$. Electrode means L is similar and driven by the other phase $\phi_{A2}$.

In the non-interlaced (neither vertical nor horizontal) mode of operation, during the so called "integration" time, comparable to the exposure time in the camera art, the electrode means K may be held at a voltage level to cause depletion regions to form in the substrate. Electrode means L may be held at a voltage level to form potential barriers between the depletion regions. Channel "stops", not shown explicitly, are present to prevent the charge in one channel from passing to the next channel. Under those conditions, the radiant energy image, such as a light or an infrared image, as examples, projected onto the array causes the generation and accumulation of charge signal at the respective photosensing locations. The number of charge carriers which accumulate at each location during the integration time is proportional to the amount of radiant energy reaching that location and this, in turn, is proportional to the radiation intensity and the duration of the integration time. The array 12 and register 14 are masked to prevent radiation from reaching these structures.

At the termination of the integration time, the charge carriers are shifted from the photosensing array 10 to the temporary storage array 12. The shifting is accomplished, in the example illustrated, by the two sets of two phase voltages $\phi_{A1}$, $\phi_{A2}$ and $\phi_{B1}$, $\phi_{B2}$. (Three or four phase operation also would be possible.) During this shifting operation, $\phi_{A1} = \phi_{B1}$ and $\phi_{A2} = \phi_{B2}$. After the information detected by the array 10 has been shifted in its entirety to the temporary storage array 12, it is shifted, a line (row) at a time, from the temporary storage array 12 to the output register 14. During the shifting of signals from array 12 to register 14, the photosensing array 10 may be placed in condition again to receive a light image.

The shifting of the contents of array 12 into the register 14 is accomplished by the $\phi_{B1}$, $\phi_{B2}$ two-phase voltages. After each line of information is shifted, in parallel, from array 12 to output register 14, it is then shifted in serial fashion from the output register to the output lead 20 by the two-phase voltages $\phi_{C1}$, $\phi_{C2}$. These, of course, are at a much higher frequency than the two phase voltages $\phi_{B1}$, $\phi_{B2}$ to insure that register 14 is emptied before the next line of information arrives.

In practice, the contents of the photosensing array 10 may be shifted into the temporary storage array 12 during the period corresponding to the vertical blanking time in commercial television, that is, during a period such as 900 microseconds. The output register 14 may be loaded in say 10 microseconds, the horizontal retrace time, and its contents shifted to the output terminal a bit at a time, during the horizontal line time —50 microseconds.

Figures 2A, 2B:
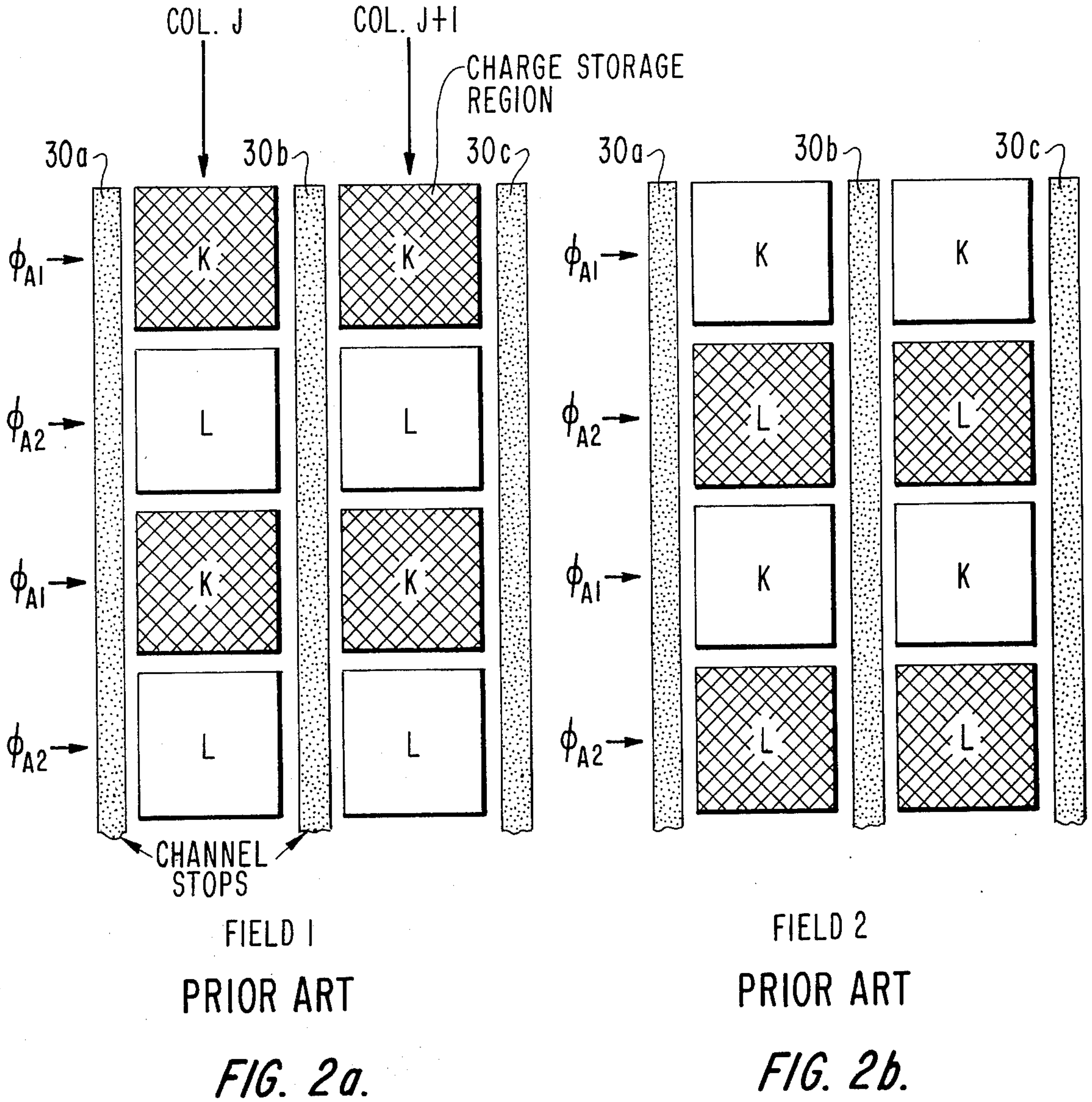

Vertical interlacing of the information read from the system of FIG. 1 may be achieved in the manner illustrated in FIGS. 2*a* and 2*b*. In these FIGURES the electrode means are shown schematically and the channel stops 30*a*, 30*b* 30*c* are also shown. During alternate field times (designated Field 1 in FIG. 2*a*) collection of charge takes place under the K electrodes and this is indicated schematically by the cross hatching of the K electrodes. This is also illustrated in FIG. 3 at *a* which shows that the K electrode means are maintained at a voltage to create relatively deep potential wells beneath these electrode means, whereas the L electrode means are held at a voltage level to create barriers between the K electrode means. After the accumulation of charge during the integration time, this charge is shifted, in its entirety from array 10 to array 12 and then from array 12 to the output register 14, a row at a time, as already discussed.

During the readout of array 12, the Field 2 of information, as shown in FIG. 2*b*, is permitted to accumulate at the photosensing array 10. Note, however, that now the charge accumulates beneath electrode means L rather than beneath electrode means K as is illustrated in FIG. 3 at *b*.

In the system just described, there are the same number of stages in output register 14 as there are columns in the array. Thus, in the example shown in FIG. 1, there are Q columns in the array and Q stages in register 14. Each I'th column of the array is shifted into the I'th register stage, where I is an integer having the value of 1, 2 . . . Q.

In the discussion which follows, the horizontal interlacing of vertically interlaced charge patterns, such as just described, will be considered by way of example. This is a preferred mode of operation because it results in improved resolution in two dimensions and in a reduction in both vertically and horizontally induced Moire patterns. However, it is to be appreciated that the present invention is equally applicable to the horizontal interlacing of patterns which are not vertically interlaced.

Figures 4A, 4B:
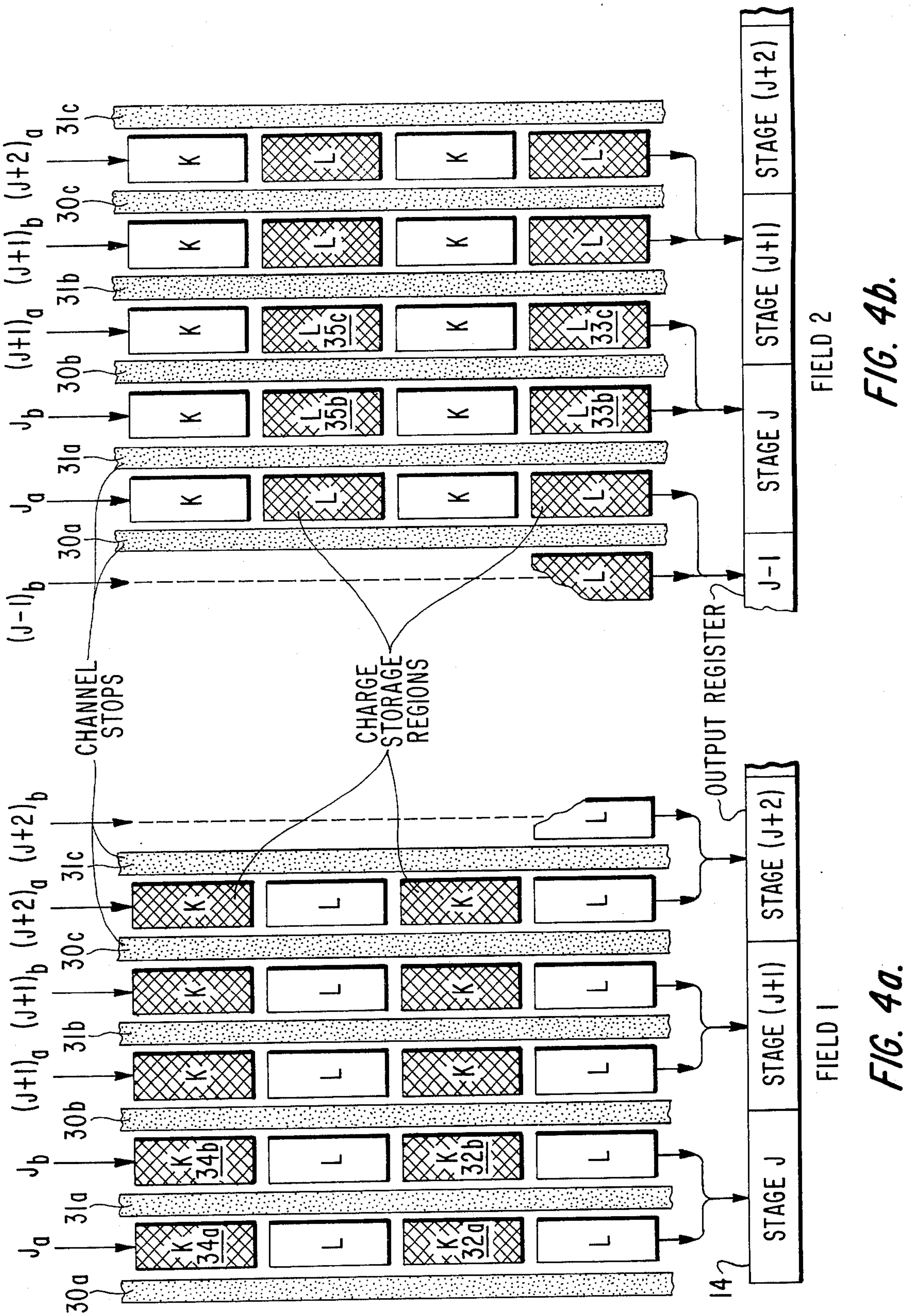

Horizontal interlacing of a vertically interlaced pattern is achieved in accordance with one embodiment of the present invention in the manner illustrated in FIGS. 4*a* and 4*b*. Each channel of the array is divided into two channels by placing an additional channel stop down the center of each channel. Thus, there is located between channel stops 30*a* and 30*b* a channel stop 31*a*, and there is located between channel stops 30*b* and 30*c* a channel stop 31*b*, and so on. These channel stops run down the entire length of the photosensing array 10 and temporary storage array 12. The output register 14, however, is not modified. Thus, there is now only one register stage for each pair of channels.

The operation is as depicted in FIGS. 4*a* and 4*b*. During alternate field times, charge collection takes place beneath the K electrodes in each column. These alternate field times hereafter arbitrarily are termed "odd" field times. However, after the shifting of the charge from the photosensing array and through the temporary storage array 12, the charge present in two adjacent columns, such as $J_a$ and $J_b$, is combined into a single stage J in the output register. For example, the charges beneath electrode means 32*a* and 32*b* will be combined and placed in stage J of the output register. At a later time, the charges beneath the electrode means 34*a* and 34*b* will be combined and placed in stage J and so on. The means for combining is the output register 14, that is, it comprises the way in which the voltages are applied to the electrodes of register 14 to effect the transfer of the last row of information from the array 12 to the register 14, as discussed in more detail later.

During the remaining fields, herein arbitrarily termed "even" fields, integration of charge takes place beneath electrodes L rather than K; however, now different columns are combined during the shifting of information out of the array. Whereas, during the odd field times, the charge signals present in columns $J_a$ and $J_b$ are combined and placed in stage J, during the even field times the charge signals present in column $J_b$ and $(J+1)_a$ are combined and placed in stage J, as illustrated in FIG. 4*b*. For example, during one period, charges beneath L electrodes 33*b* and 33*c* are combined; later, charges beneath electrodes 35*b* and 35*c* are combined and so on.

The result of operating in the way illustrated in FIGS. 4*a* and 4*b* is to obtain both vertical and horizontal interlacing with its advantages of increased vertical and horizontal resolution and a very substantial reduction of Moire pattern production. The modifications needed are relatively small. An additional channel stop is needed between each pair of existing channel stops and these additional channel stops can be laid down at the same time as the present channel stops. As an alternative, the same mask may be employed for channel stops 31 as for channel stops 30 by shifting the mask during an additional photoresist exposure step. No new masks are needed for the electrodes. (Note that while these electrodes are shown as single blocks in FIGS. 4*a* and 4*b*, this is a highly schematic showing. In practice, the K electrodes of a row comprise one single conductor such as a metal layer. Similarly, each group of L electrodes in a row is one conductor.) As will be seen shortly, the only other modification needed is the way which voltages are applied to the output register 14 electrodes.

Figure 5A:
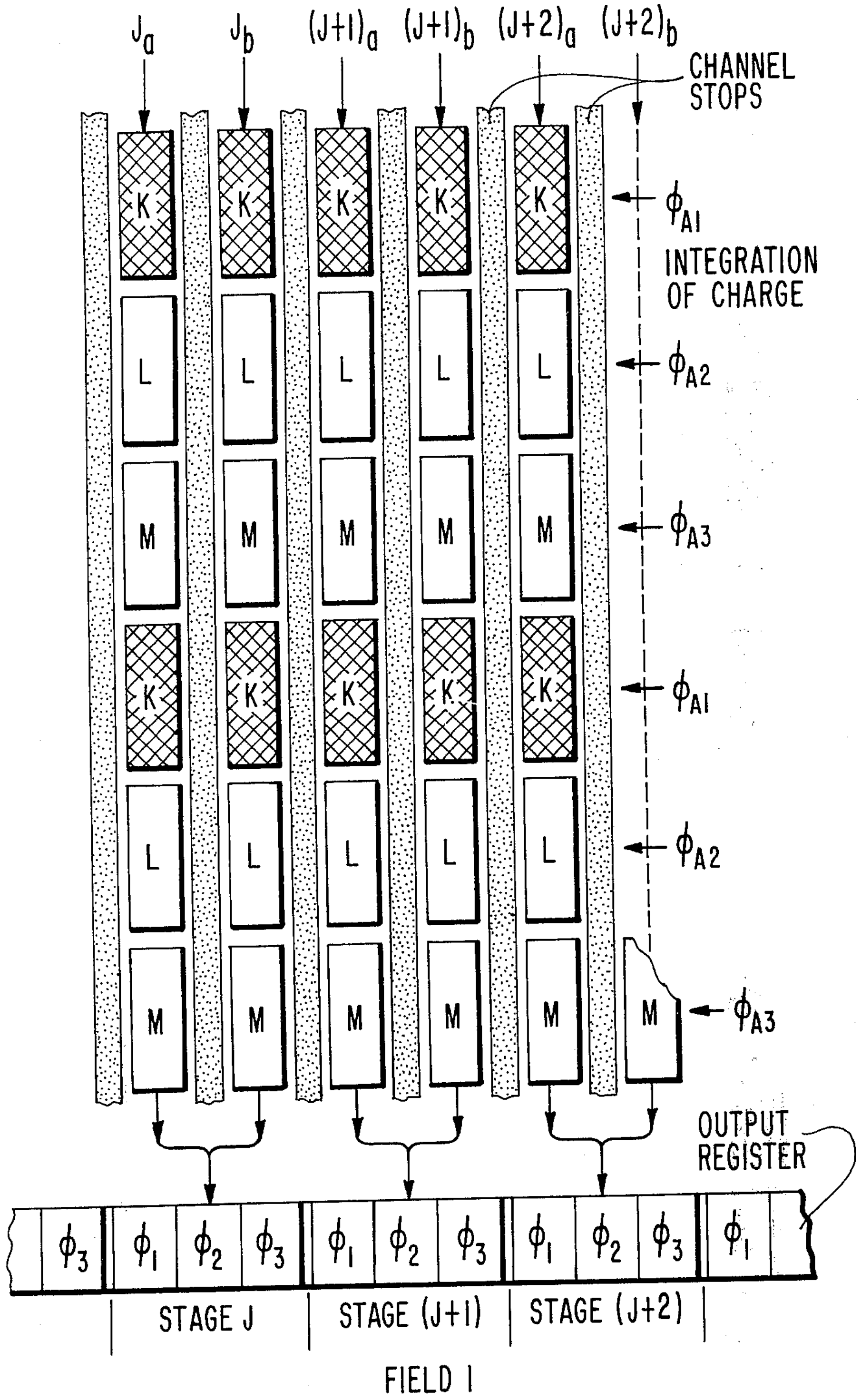
Figure 5B:
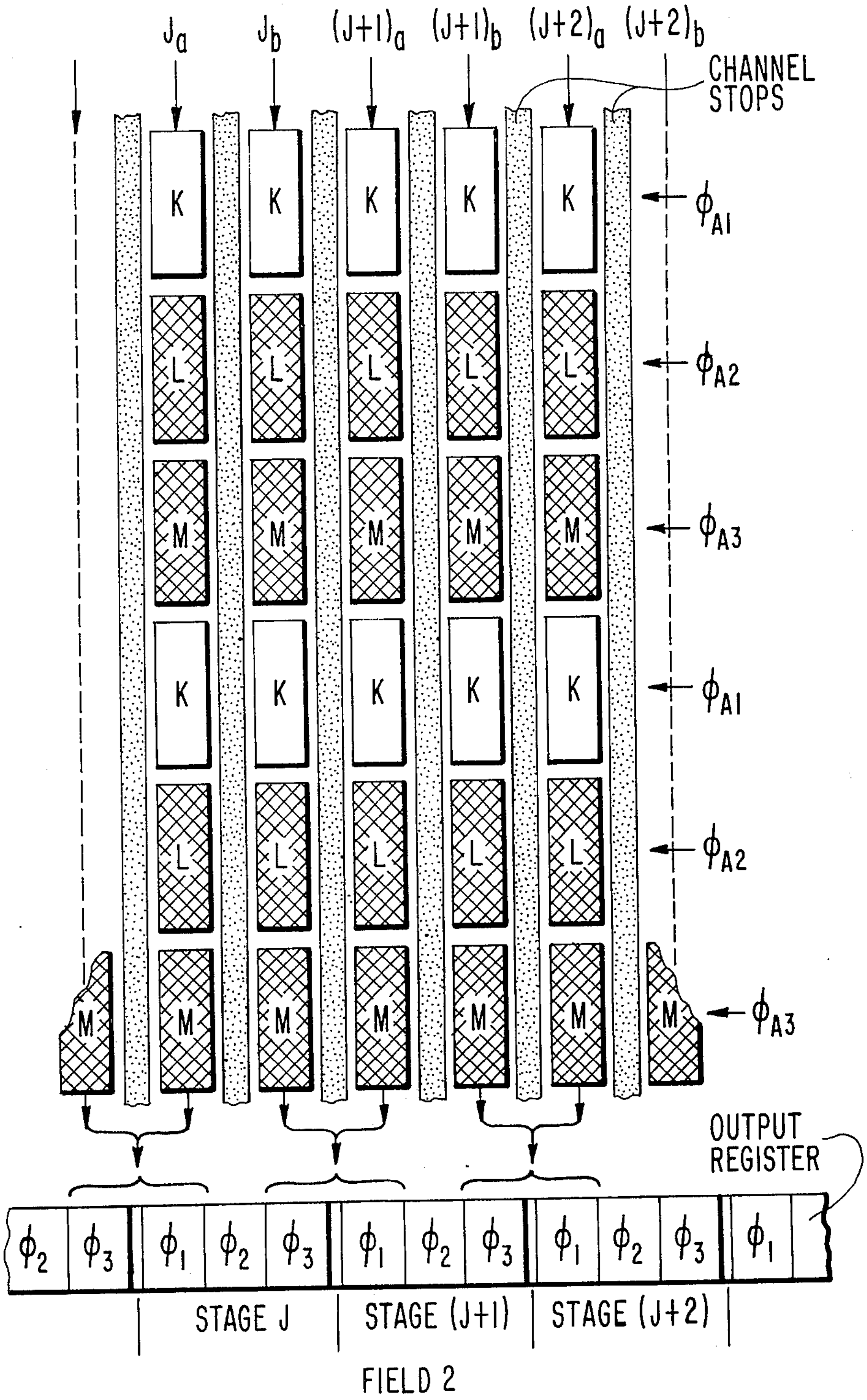

FIGS. 5*a* and 5*b* show one way of horizontally interlacing the information sensed by a three phase array. During odd fields, integration takes place under the K electrodes and the contents of each pair of columns such as $J_a$ and $J_b$ is shifted into a register stage such as the J'th stage. For example, the charge signal in the $J_a$ and $J_b$ columns may be shifted into the potential well beneath the $\phi_2$ electrode of the J'th stage.

During the even field times, integration may take place beneath the L and M electrodes as illustrated in FIG. 5*b*. The charge signal present in the $J_b$ and $(J+1)_a$ columns may now be shifted into the potential well beneath the $\phi_3$ electrode of the J'th stage and the $\phi_1$ electrode of the (J + 1'th) stage. During the following step, shown in FIG. 5*b*, the voltage applied to the $\phi_1$ electrodes may be changed to collapse the potential well beneath that electrode so as to empty the charge signal stored beneath the $\phi_1$ electrodes into the potential wells remaining beneath the $\phi_3$ electrodes. The purpose of this additional step is to insure that the charge signal shifted from the $J_b$ and $(J+1)_a$ columns during the even fields ends up in the same register stage as the charge signal shifted from the $J_a$ and $J_b$ columns during the even fields.

In the embodiments both of FIGS. 4 and 5, in the embodiments discussed later, the signals shifted from the output register 14 during the even fields must be effectively shifted in time relative to the signals shifted from the output register during the odd fields to obtain interlacing of the subsequently displayed image, that is, to display the odd fields in the same relative position on the display means (such as kinescope) as where the fields are received on the photo-sensor array, and to display the even fields in a position on the display corresponding to that at which they are received on the photo-sensor array. (The term "effectively" is used above to include achieving the same result by adjusting the times of occurrence of the horizontal synchronization pulses.) The control circuits for obtaining the delay are conventional.

Figure 6:
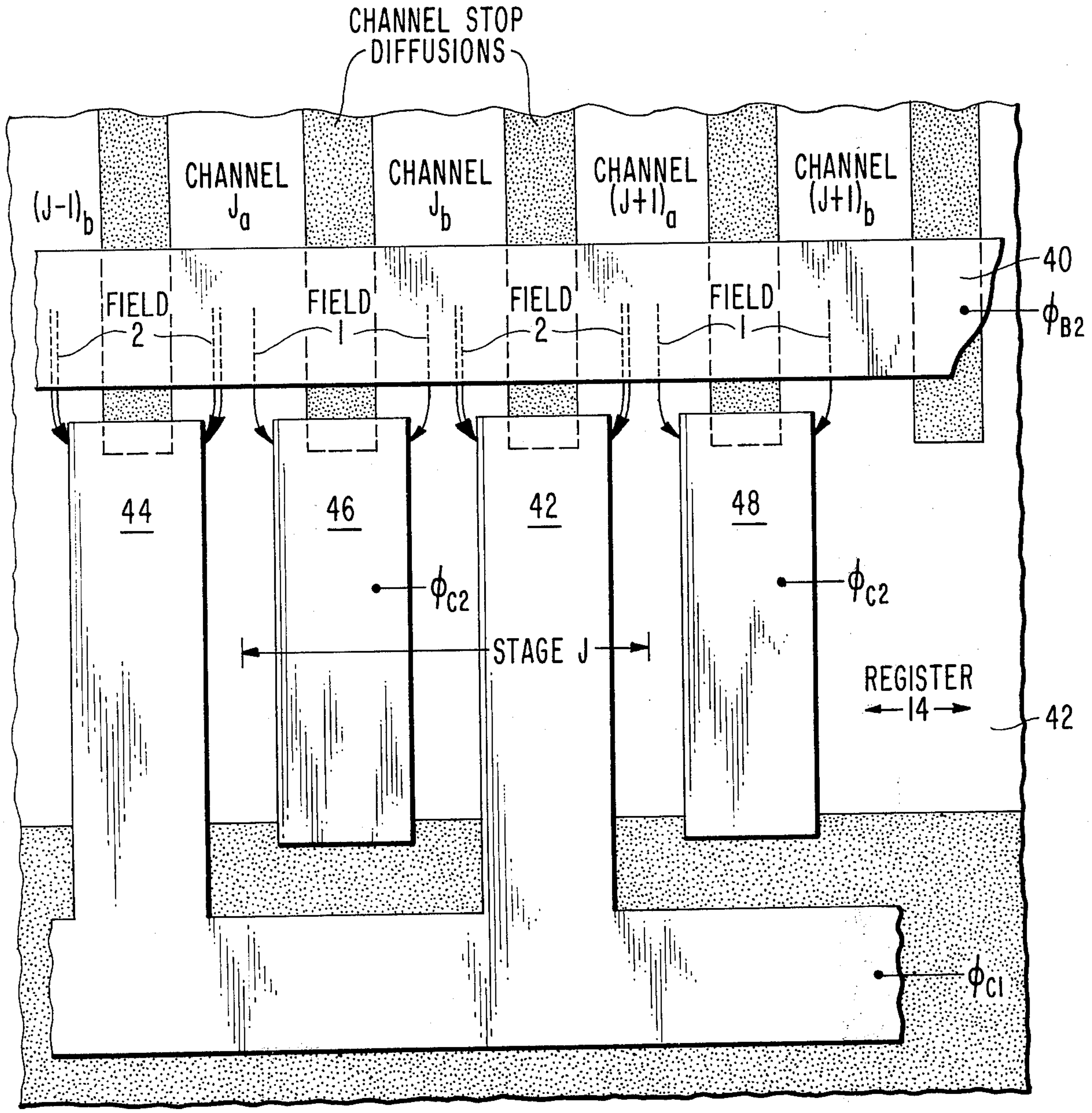
FIGS. 6 and 7 are plan views of a portion of the output register of FIG. 1 operated in accordance with the present invention.
Figure 7:
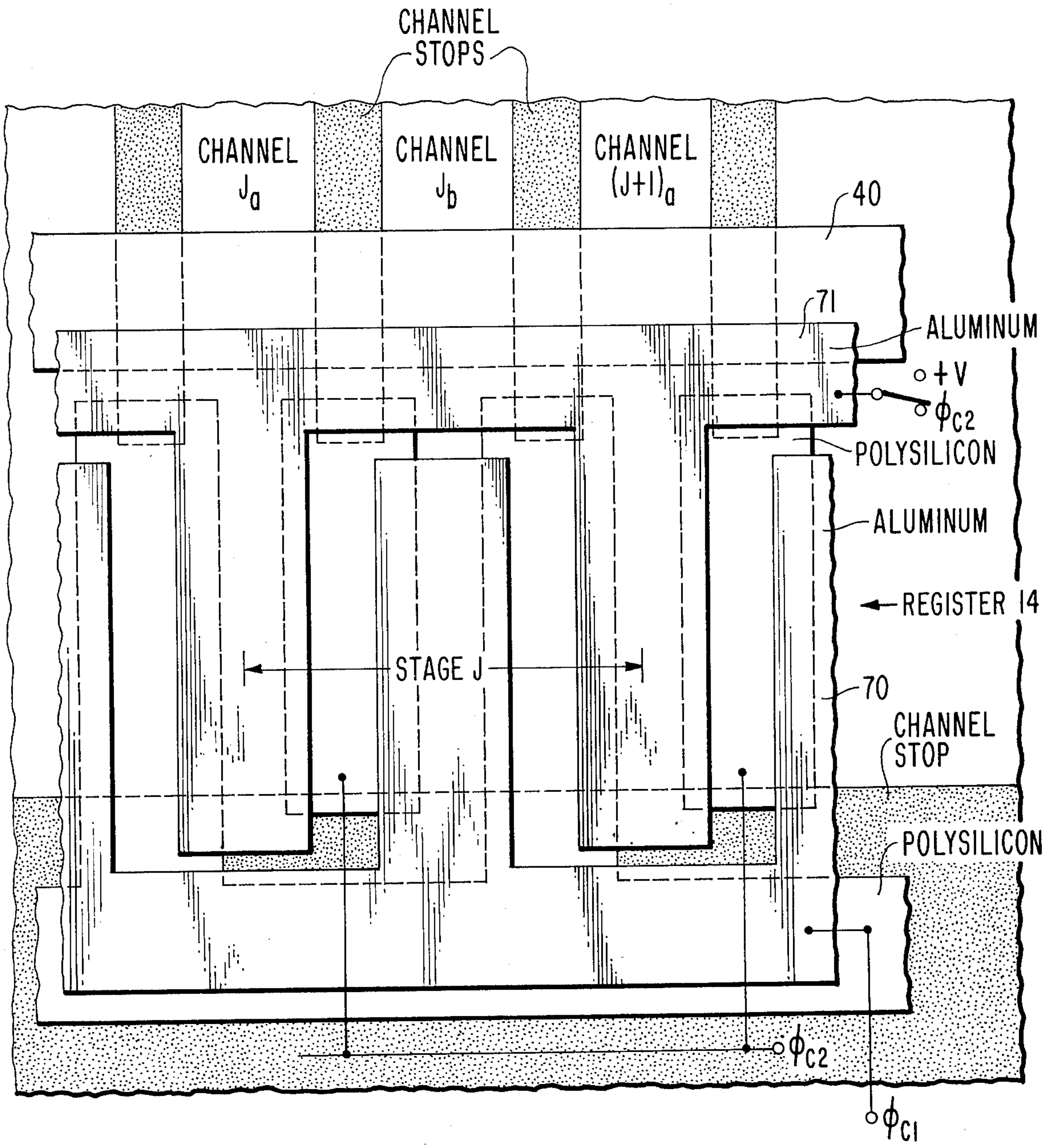

FIG. 6 shows the actual structure which may be employed for adding the charge signal present in the columns in a two phase system. Only the polysilicon electrodes are shown in FIG. 6 to keep the drawing simple. Also the channel stop defining the lower edge of register 14 is not shown. FIG. 7, which is discussed later, shows also the aluminum electrodes of the output register 14 and the lower channel stop. Both FIGS. 6 and 8 should be referred to in the explanation which follows.

Figure 8:
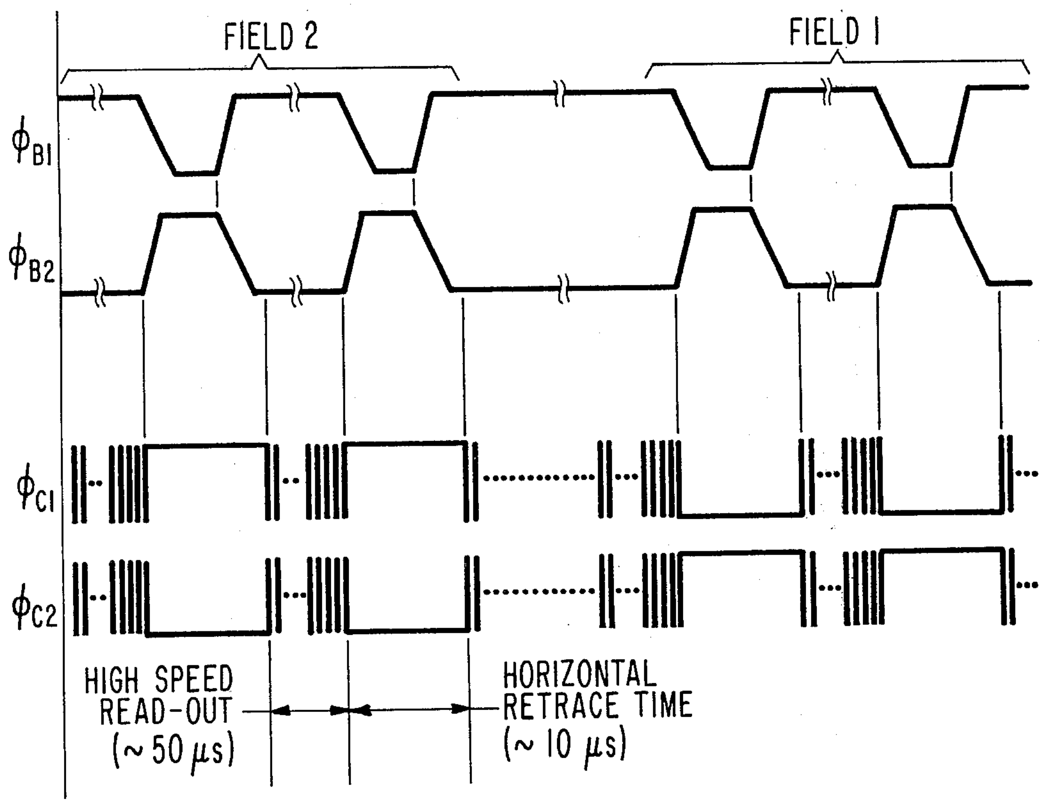
FIG. 8 is a drawing of waveforms to help explain the operation of the system illustrated in FIGS. 6 and 7.

FIG. 8 shows the two phase voltages applied to the electrodes of array 12. However, FIG. 6 shows only the last electrode 40 of this array, which last electrode receives the voltage $\phi_{B2}$. As may be observed in FIG. 8, after the field 2 integration time, each time the voltage $\phi_{B2}$ is applied to the last row of polysilicon electrodes 40 of the temporary storage array 12, the voltage $\phi_{C1}$ goes high. The substrate 42 is assumed to be of P type material and the minority charge carriers therefore are electrons. When $\phi_{B2}$ goes high, the charge signal (electrons) propagate to electrode 40. The voltage $\phi_{C1}$ goes high at the same time as $\phi_{B2}$ goes high, so that the charge signals in the $J_b$ and $(J + 1)_a$ channels propagate to the potential well beneath the polysilicon electrode 42 of the J'th stage. Similarly, the charge signals present in the $(J - 1)_b$ and the $J_a$ channels propagate to the potential well beneath polysilicon electrode 44 of the (J − 1'th) stage of register 14, and so on.

After the information becomes stored in the register 14, $\phi_{B2}$ goes low to prevent the charge signal in register 14 from passing back to the temporary storage array 12 when $\phi_{C1}$ goes low. Next, the high speed readout of register 41 occurs. This readout is achieved by applying the high frequency multiple phase voltage $\phi_{C1}$, $\phi_{C2}$ to the electrodes of register 14 as illustrated schematically in FIG. 8.

During the time the second field is being read from the temporary stage array 12, the first field integrates in the photosensing array 10. It is then shifted into the temporary storage array 12 and read from the temporary storage array into the output register 14 in the manner illustrated in FIG. 6, and in FIG. 8 under field 1. It may be observed that when $\phi_{B2}$ goes high, $\phi_{C1}$ is low and $\phi_{C2}$ goes high. In response to these voltages, the charge signals present in the $J_a$ and $J_b$ channels pass to the potential well beneath polysilicon electrode 46 of stage J. Similarly, the charge signals present in channels $(J + 1)_a$ and $(J + 1)_b$ pass to the potential well beneath polysilicon electrode 48 of stage J + 1 of output register 14, and so on. The remainder of the operation is believed to be self-evident from what has already been discussed.

FIG. 7 shows the aluminum electrodes which overlap the polysilicon electrodes. The $\phi_{C1}$ aluminum electrode may be permanently connected to the $\phi_{C1}$ polysilicon electrode, as shown. The $\phi_{C2}$ aluminum electrode 71 is maintained at a voltage +V during the transfers of charge to register 14 and is tied to $\phi_{C2}$ during the propagation of charge down register 14. The voltage +V is of a value to create a potential well beneath electrode 71 which is deeper then that beneath electrode 40 and shallower than that beneath the selected polysilicon electrodes of the register 14 during the transfer of charge to register 14. While the means for connecting +V or $\phi_{C2}$ is shown as a mechanical switch, it is to be understood that, in practice, an electronic switch is employed.

Figure 9:
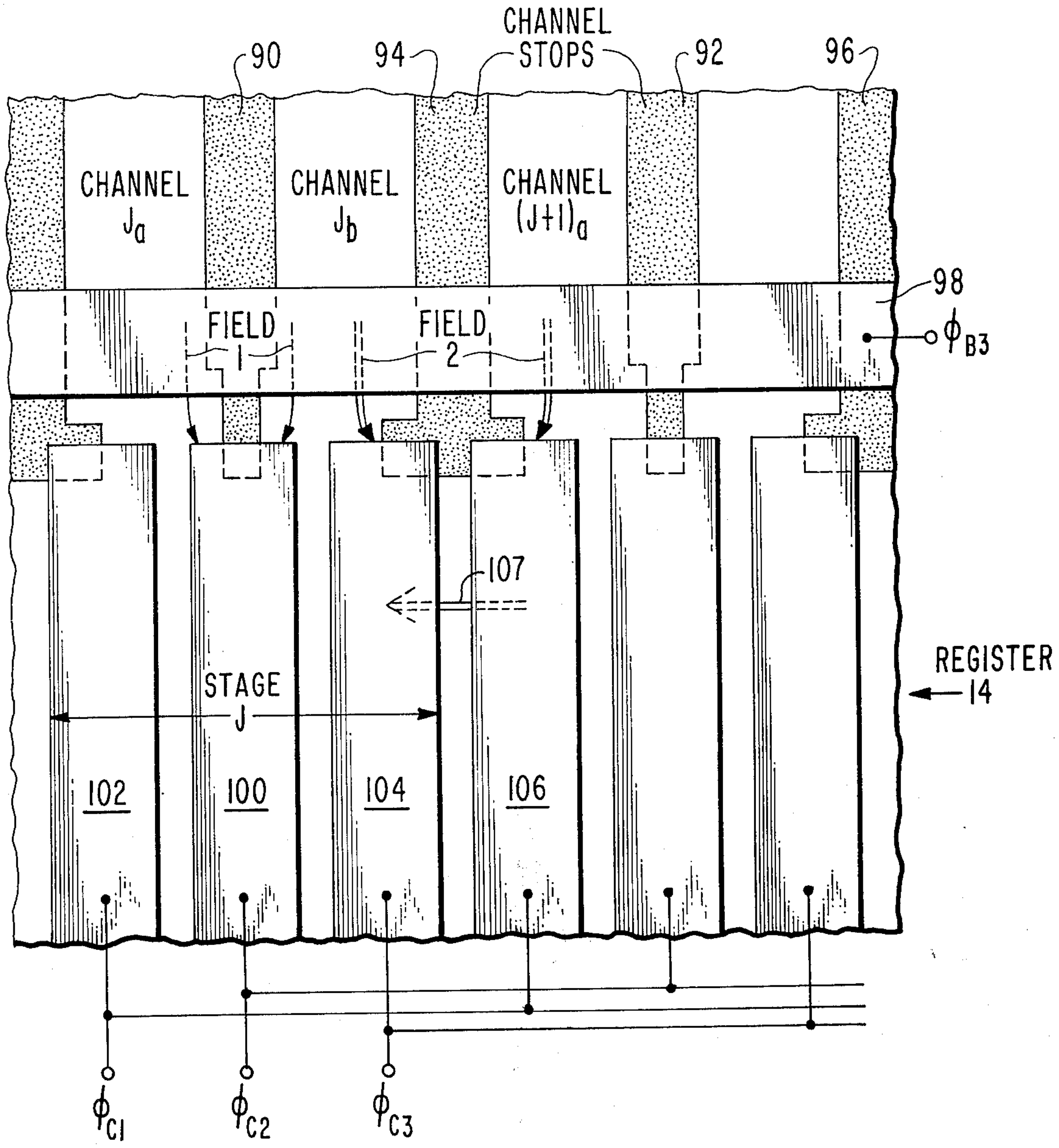
FIG. 9 is a plan view of a portion of another embodiment of the invention, this one for three phase operation.

FIG. 9 shows the output structure for a three phase embodiment of the invention. Alternate channel stops such as 90, 92 and so on are necked down at their ends to make the channels wider at their ends and to facilitate the transfer of charge as discussed shortly. The remaining channel stops 94, 96 and so on are made wider at their ends to direct the flow of charge.

Figure 10:
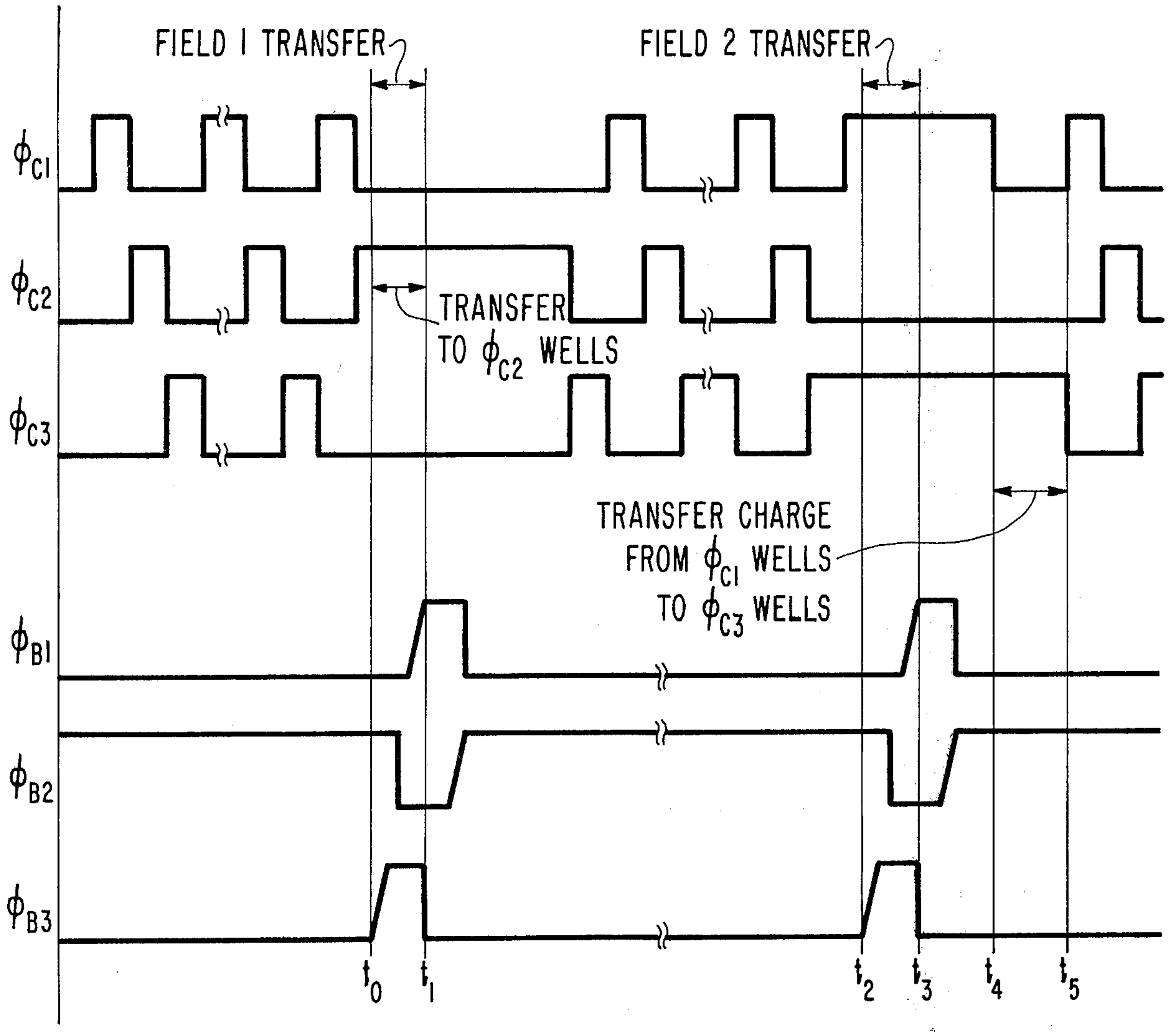
FIG. 10 is a drawing of waveforms to help explain the operation of the circuit of FIG. 9.

In the discussion of the operation which follows, both FIGS. 9 and 10 should be referred to. FIG. 10 shows the three phase voltages for the temporary storage array analogues to the array 12 of FIG. 1; however, only the last three phase electrode 98 of this array is shown in FIG. 9. Again, the substrate is of P type so that the minority carriers are electrons.

In operation, at time $t_0$ of the field 1 time, charge starts to transfer to the potential well being created under electrode 98. This electrode and the others may be formed of aluminum. This charge subsequently transfers to the potential wells beneath the $\phi_{C2}$ electrodes, such as electrode 100. Note that this electrode 100 is at a relatively positive voltage level during the period $t_0$ to $t_1$, whereas the surrounding electrodes 102, 104 are at a less positive potential. After the transfer of charge, it subsequently is propagated out of the register by the application of the three phase voltages $\phi_{C1}$, $\phi_{C2}$ and $\phi_{C3}$. The timing in FIG. 10 is not drawn to the scale which would be employed for commercial television.

The second field is transferred as shown at the right in FIG. 10. During the period $t_2$–$t_3$, charge transfers to beneath the last electrode 98 at the end of the channels of the array 12 and then transfers to the potential wells beneath the $\phi_{C1}$ and $\phi_{C3}$ electrodes. In the example illustrated in FIG. 9, charge transfers from channel $J_b$ and $(J + 1)_a$ to beneath electrode 104 of stage J and electrode 106 of stage (J + 1). It will be recalled that during the field 1 time, charge transferred from a different pair of channels $J_a$ and $J_b$ to register stage J. Subsequent to the transfer during the period $t_2$–$t_3$, the charge present under electrode 106 transfers to beneath electrode 104 as indicated by arrow 107. This transfer takes place during the period $t_4$–$t_5$ of FIG. 10. During this period, $\phi_{C1}$ goes low while $\phi_{C3}$ remains high so that the potential wells beneath the $\phi_{C1}$ electrodes such as 106 are emptied into the potential wells beneath the $\phi_{C3}$ electrodes such as 104. After the transfer is completed, multiple phase voltages $\phi_{C1}$, $\phi_{C2}$ and $\phi_{C3}$ start and the charge signals are propagated out of the register.

Figure 11:
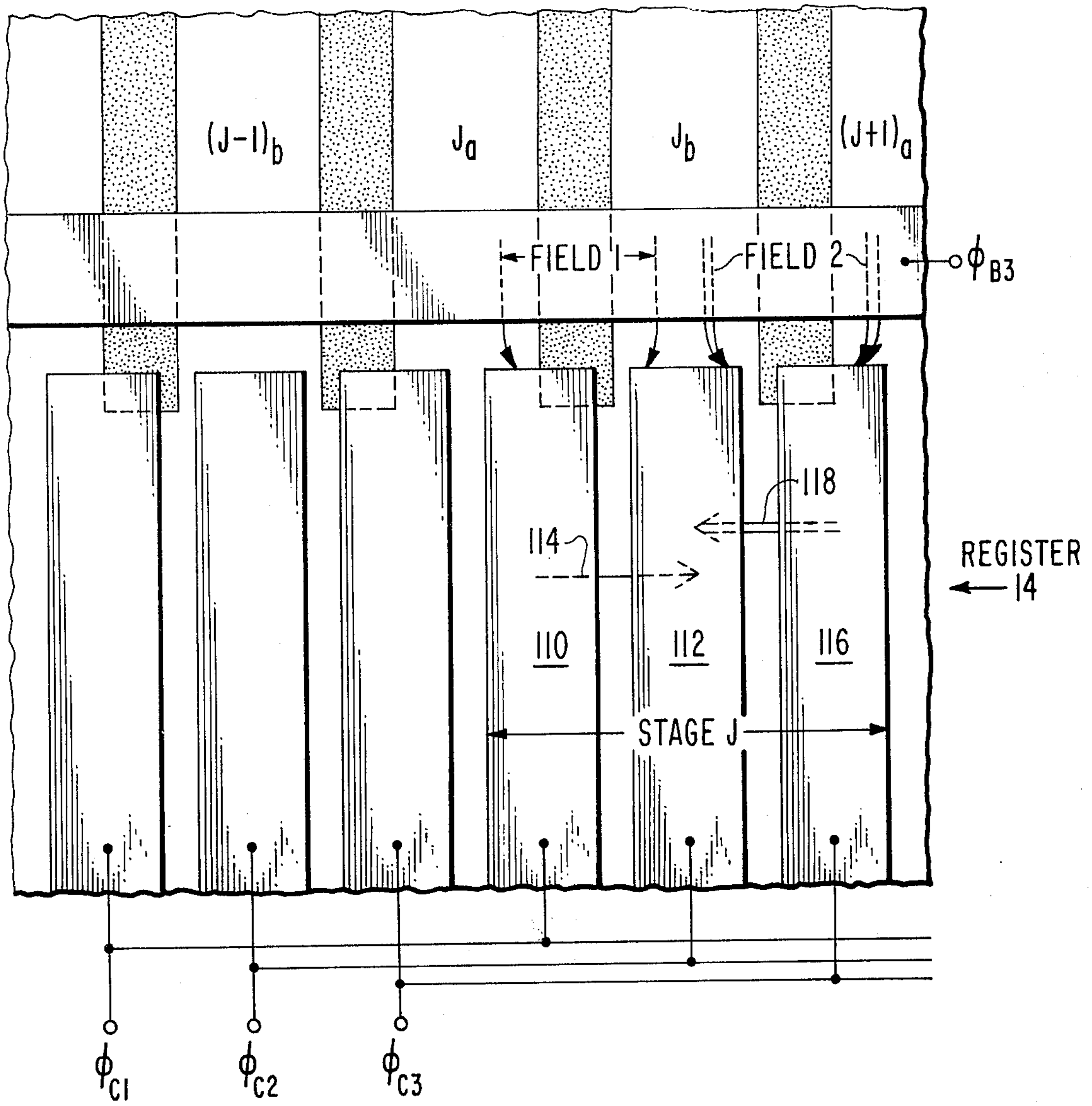
FIG. 11 is a plan view of another three phase embodiment of the invention.
Figure 12:
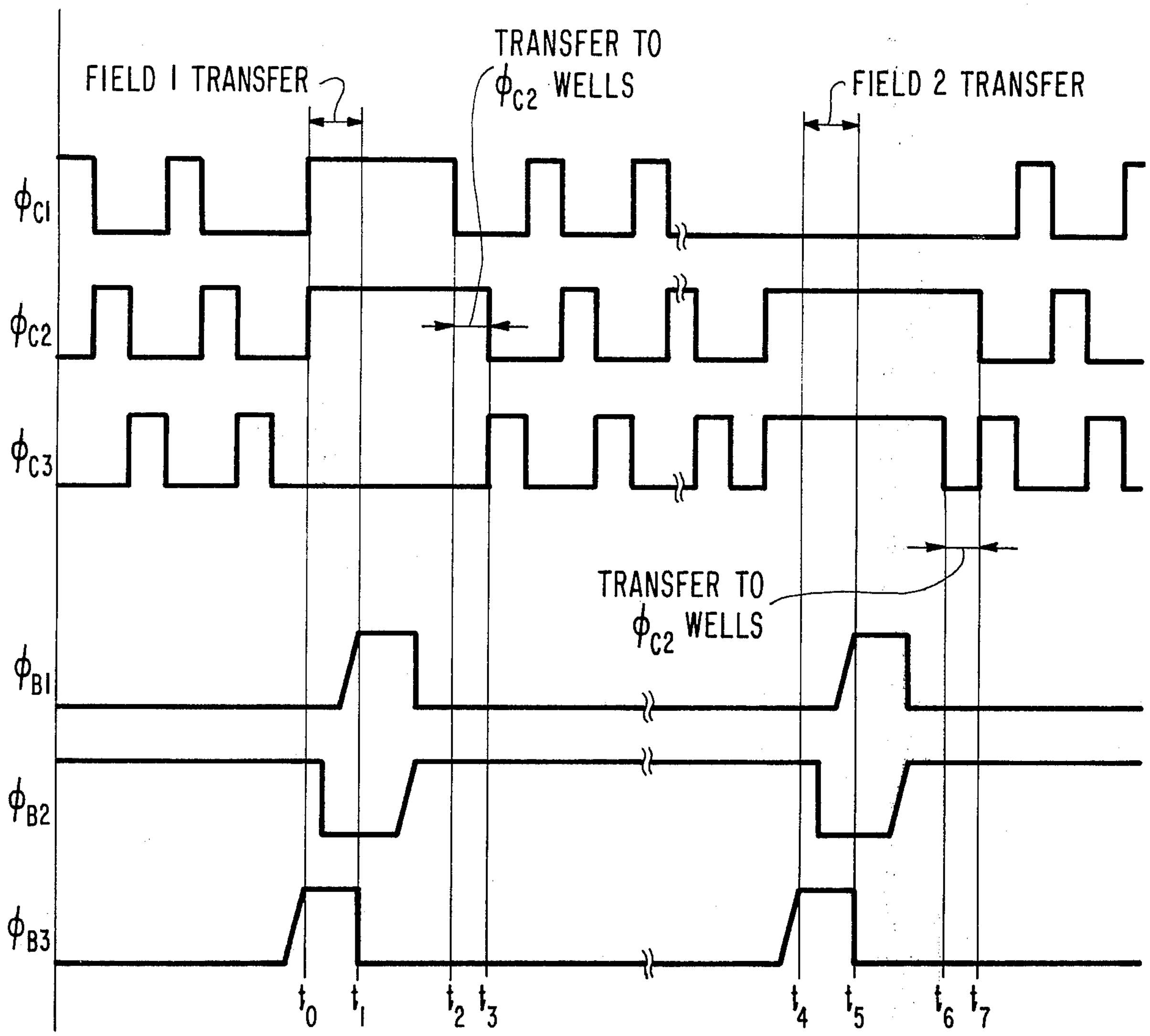
FIG. 12 is a drawing of waveforms to help explain the operation of the circuit of FIG. 11.

FIG. 11 illustrates a somewhat different configuration of channel stops and a somewhat different positioning of the aluminum electrodes of register 14 relative to the channel stops. The operation is depicted in FIG. 12. During the time $t_0$ to $t_1$ of field 1, charge signals in channels such as $J_a$ and $J_b$ transfer to the $\phi_{C1}$ and $\phi_{C2}$ electrodes such as electrodes 110 and 112 at stage J. A short time later, during the period $t_2$–$t_3$, the charge present under electrodes such as 110 is shifted to beneath the adjacent electrode 112 as indicated schematically by the arrow 114. Then the contents of the register 14 is shifted out of the register.

During the interval $t_4$–$t_5$ of the field 2 time, the charge signal present in channels such as $J_b$ and $(J+1)_a$ is transferred to the wells beneath the $\phi_{C2}$ and $\phi_{C3}$ electrodes such as 112 and 116 of stage J. Later in the period, that is, during time $t_6$–$t_7$, $\phi_{C3}$ goes low so that the potential wells beneath the $\phi_{C3}$ electrodes such as 116 empty into the potential wells beneath the $\phi_{C2}$ electrodes such as 112. This is indicated schematically by the arrow 118. Then the contents of the register 14 is shifted out of the register by the application of the $\phi_{C1}$, $\phi_{C2}$ and $\phi_{C3}$ voltages.

While in the discussions above, only the transfer of one row of information is discussed, it is to be appreciated that all of the rows of a field are shifted from array 12 to register 14 before the rows of the following field are shifted out of array 12. It is also to be appreciated that the three output structures illustrated, one for two phase and the other for three phase, are intended as examples only, as other alternatives are possible. It is also to be understood that the three phase vertical interlacing system illustrated is given only by way of example. As a second example, during odd fields, integration may take place beneath the K and L electrodes and during even fields, beneath the M electrodes.

FIG. 13 shows various interlaced patterns as they are displayed. FIG. 13*a* shows a pattern which is only vertically interlaced as described in connection with FIGS. 2*a* and 2*b*. Field 1 is represented by circles and field 2 by crosses.

Figure 13A:
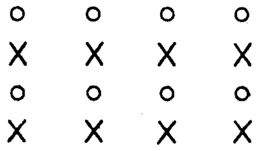
FIGS. 13*a*–13*h* illustrate schematically various interlaced patterns which are possible in the systems described in this application.
Figure 13B:
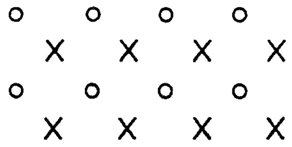
Figure 13C:
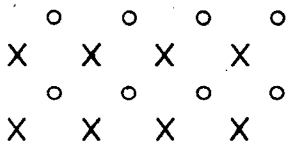

FIGS. 13*b* and 13*c* show patterns which are both vertically and horizontally interlaced and which are obtained in the manner discussed, for example, in connection with FIGS. 4*a* and 4*b*. In the pattern of FIG. 13*b*, vertical field 2 is relatively shifted to the right by one column with respect to vertical field 1. Each line within a single vertical field is in the same relative horizontal position. In FIG. 13*c*, vertical field 2 is horizontally shifted to the left by one column relative to vertical field 1. Here too, each row within a single vertical field is in the same relative horizontal position.

Figure 13D:
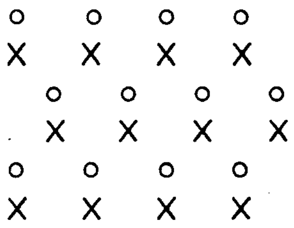

It is also possible in accordance with the present invention to change the horizontal interlace from one row to the next during a single field. Such forms of interlacing are shown in the remaining figures. In FIG. 13*d*, for example, the even numbered rows 2, 4, 6 (only three rows of each field are shown) and so on of field 1 are shifted to the right by one column relative to the odd numbered rows 1, 3, 5 and so on in the same field. Similarly, in vertical field 2, rows 2, 4, 6 and so on are relatively shifted to the right by one column with respect to rows 1, 3, 5 and so on.

Figure 13E:
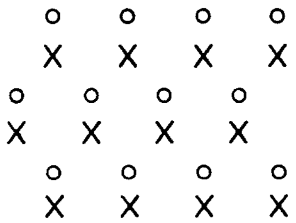

FIG. 13*e* is similar to FIG. 13*d* except that in each field the second, fourth, sixth and so on rows are relatively shifted to the left by one column with respect to the first, third, fifth and so on rows (again only three rows are shown for each field).

Figure 13F:
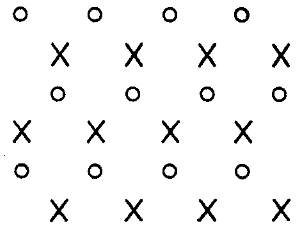

FIG. 13*f* represents still another pattern. Here the first row of field 2 and the second row of field 1 are shifted to the right by one column relative to the first row of field 1. The second row of field 2 and the third row of field 1 are horizontally aligned with the first row of field 1. In another alternative, not shown, which is similar to that shown in FIG. 13*f*, a pattern complementary to that of FIG. 13*f* is obtained in the following sense. The first row of vertical field 2 and second row of field 1 are shifted to the left by one column with respect to the first row of vertical field 1. The second row of vertical field 2 and third row of field 1 are in the same relative horizontal position as the first row of vertical field 1.

Figure 13G:
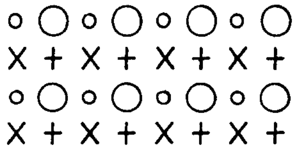
Figure 13H:
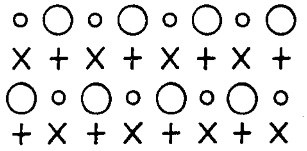

FIGS. 13*g* and 13*h* represent somewhat more complicated vertical and horizontal interlaced patterns. In the patterns already discussed each point in the field is sampled in each frame time which consists of two successive fields. In the pattern of FIGS. 13*g* and 13*h*, a given point is sampled only during every fourth field. Thus, the small circles illustrate field 1; the crosses with diagonal arms represent field 2; the large circles represent field 3; the crosses with vertical and horizontal arms represent field 4. With the explanation above, it is believed that FIGS. 13*g* and 13*h* are self-evident.

In the interlacing arrangements of FIGS. 13*g* and 13*h*, as each point is sampled only every fourth field, the sampling rate is lower than in the previous systems assuming the same field rate. In commercial television, for example, the sampling rate would be 15 rather than 30 times per second and at this rate some flicker would be evident. However, where some integrating medium other than the human eye is involved (a camera, for example,) that is not necessarily a disadvantage.

All of the patterns illustrated in FIGS. 13*b–h* are obtainable in a manner which should be self-evident from the description already given. The horizontal interlacing desired is obtained by placing appropriate voltages on the various electrodes making up the output register 14. In the embodiments of the invention described in detail, the same voltages are employed for each row of a vertical field to obtain the pattern of FIG. 13*b* or FIG. 13*c*. In the embodiments illustrated in FIGS. 13*d*–13*h*, the voltages applied to the electrodes of register 14 are changed from line to line of each vertical field to produce the more complex interlaced patterns. The particular pattern chosen for a particular application will depend upon such design requirements as the scanning time; the number of columns and rows; the amount of flicker which can be tolerated; whether the displayed image is to be viewed or photographed; the image intensity desired and so on.

An important aspect of the present invention is that it permits the realization of a CCD imager which is suitable for commercial 525 horizontal television line systems. Present developmental CCD imagers can be vertically interlaced to provide 512 lines for display on a standard television monitor. However, these existing developmental arrays cannot provide the television broadcast requirements for resolution elements in the horizontal direction. The basic reason has to do with impossibility, at the present state of the art, of "packing" the required number of stages into the output register 14.

The largest developmental arrays known to present applicants have 320 columns or channels and each is some 30 to 40 microns ($\mu$m) wide. This dimension defines the width of one electrode. In the existing art, the output register 14 must have one stage for each column. In a two phase system, that stage has two pairs of electrodes and the combined length of these two pairs of electrodes must be not greater than approximately the width of a channel, that is, 30–40 $\mu$m. It is possible, using modern photolithographic techniques, to make these electrodes sufficiently small so that they fit into this available space.

If, to increase resolution, twice the number of columns is employed, as suggested in the present application, then if the prior art register 14 were employed, each stage in the register would have available only 15–20 $\mu$m of space (in length dimension). This means two pairs of electrodes (their combined length) would have to fit into this space and the electrodes cannot be made this small by standard photolithographic techniques. Also, the register would have to be clocked at a frequency high enough to read out this large number of stages in 50 microseconds (for standard commercial television). While this rate of operation is possible, it places undue demands upon the performance of the CCD register 14 and also requires higher driving power.

In the present invention while the number of columns in the array can be doubled, only one stage in the output register is needed for each pair of columns. This means the output register only has to have 320 stages. Thus, each stage can still occupy 30–40 microns and this is within the capability of standard photolithographic techniques. The clock frequency needed is only 6.4 MHZ which is reasonable. Thus, with the minor modifications described herein, it is possible to achieve the broadcast resolution requirements for standard television using standard development CCD arrays which are already available.

While the present invention has been described in terms of a CCD image sensing system using P-type substrate, it is to be understood that it is equally applicable to systems using N-type substrates. The invention is to be understood to be applicable both to surface channel and buried channel CCD systems. Also, while the invention has been illustrated in terms of two and three phase systems, it is equally applicable to higher phase systems.

In addition, while in the various embodiments of the invention, horizontal interlacing is achieved by combining the signals shifted down two columns of the array into one stage of the array, other alternatives are possible. In a three phase system, assuming each stage in the array has three electrodes K, L and M, vertical interlacing may be obtained in the following way. During one field, the regions K store charge which is sampled; during a second field, the regions L store charge which sampled; and during the third field, the regions M store charge which is sampled. Horizontal interlacing is obtained as follows. During the first field columns $J_a$, $J_b$ and $(J + 1_a)$ are combined in stage J; during the second field columns $J_b$, $(J + 1_a)$ and $(J + 1_b)$ are combined in the stage J; and during the third field columns $(J - 1_b)$, $J_a$ and $J_b$ are combined in stage J. In general, in an N-phase system, N columns can be combined into a single output register stage which means the number of stages in the output register can be as low as Q/N, where Q is the number of columns.

While a particular electrode structure has been shown in FIG. 3 to illustrate the invention, it is to be understood that this is an example only. Many other alternatives well-known in the art are possible and suitable.

In the various systems discussed herein, the same phase voltages have been used for the A, B and C registers (10, 12 and 14). It is to be appreciated, however, that other alternatives are available. For example, arrays 10 and 12 may be operated by two phase voltages and register 14 by three phase voltages. This would permit double vertical interlace and triple horizontal interlace. As a second example, arrays 10 and 12 may be operated by three phase voltages and register 14 by two phase voltages. Here triple vertical interlace and double horizontal interlace may be obtained.

What is claimed is:

1. A method of interlacing both vertically and horizontally the information received by an image sensing array having Q columns and S rows of image sensing locations where each location comprises N image sensing elements in a column and where Q, S and N are integers greater than 1, and for placing the interlaced information in the stages of a shift register having Q/2 stages comprising the steps of:

sensing the image during a first integration time only at corresponding groups of M of the N elements at each location, where M is an integer equal to at least 1 and which is less than N, and converting the radiation sensed at each location into a charge proportional to the amount of said radiation;

shifting the charge accumulated during the first integration time into said output register with the charge stored in each pair of adjacent columns being concurrently shifted into a register stage for that pair of columns;

sensing the image during a second integration time only at the remaining groups of M-N elements at each location and converting the radiation sensed at each location into a charge proportional to the amount of said radiation; and shifting the charge accumulated during the second integration time into said output register with the charge stored in each pair of adjacent columns being concurrently shifted into a register stage for that pair of columns, where each pair of columns selected for shifting the charge accumulated during the second integration time is different than each pair of columns selected for shifting the charge accumulated during the first integration time and includes one column taken from one pair and a second column taken from a second pair of columns employed for shifting the charge accumulated during the first integration time.

2. A method of horizontally interlacing a vertically interlaced charge pattern of the type in which a first portion of the pattern is shifted out of an image sensing array in the column direction during a first time period to provide one field of a frame and a second portion of the pattern, vertically interlaced with the first, is shifted out of the array in the column direction during a second time period to provide a second field of the frame, comprising the steps of:

during the first time period, combining into a single charge signal, each pair of charge signals present in two adjacent columns, along each row of the array; and during the second time period, combining into a single charge signal, each pair of charge signals present in two adjacent columns along each row of the array, shifted in the row direction relative to the adjacent regions selected during the first time period, by one column.

3. The combination of:

a charge coupled, image sensing array having Q columns and S rows of image sensing locations, the columns comprising the channels of the array, and each location including N electrode means along a channel, where Q, S and N are all integers greater than 1;

an output register having Q/2 stages, one stage for each pair of columns;

means during one integration time for sensing the image at corresponding groups of M of the N electrode means at each location, and for accumulating a charge signal proportional to the amount of radiation sensed, where M is an integer less than N and equal to at least 1;

means during the following integration time for sensing the image at the remaining groups of N-M electrode means at each location, and for accumulating a charge signal proportional to the amount of radiation sensed;

means for sequentially transferring, after the first integration time, the charge signals accumulated in each pair of columns I and (I+1) to the (I+1)/2 register stage and for sequentially transferring, after the second integration time, the charge signals accumulated in each pair of columns (I+1) and (I+2) to the (I+1)/2 register stage, where I is an odd integer equal to 1, 3 . . . (Q−1); and means, after each transfer of a row of charge signals to said register, for sequentially shifting said signals out of said register.

4. A method of horizontally interlacing two sequential fields of a charge pattern read in the column direction from a charge transfer image sensing array comprising the steps of:

combining the charge signals read from each I'th and (I+1'th) columns of the array for each alternate field; and combining the charge signals read from each I'th and (I−1'th) columns of the array for each remaining field, where I is an even integer equal to 2, 4 . . . Q, and where the array includes at least Q columns.

5. A method of horizontally interlacing two sequential fields of a charge pattern read in the column direction from a charge transfer image sensing array comprising the steps of:

horizontally displacing a row of the second field relative to a row in the first field by, for each resolution element in said row in said second field, combining the charge signals read from a first group of N adjacent columns, and for each corresponding resolution element in said row in said first field, combining the charge signals read from a second group of N adjacent columns, where N is an integer equal to at least 2 and where each first group of columns includes at least one but less than all of the columns in the second group.

6. A method as set forth in claim 5 where N−1 of the columns of the second group are common to the first group.

7. A method as set forth in claim 6 where N=2.

8. A method as set forth in claim 6, where the two sequential fields comprise vertically interlaced fields.

9. The combination of:

a charge coupled, image sensing array having Q columns and S rows of image sensing locations, the columns comprising the channels of the array, and each location including N electrode means along a channel, where Q, S and N are all integers greater than 1;

an output register having Q/2 stages, one stage for each pair of columns;

means during one integration time for sensing the image at corresponding groups of M of the N electrode means at each location, and for accumulating a charge signal proportional to the amount of radiation sensed, where M is an integer less than N and equal to at least 1;

means during the following integration time for sensing the image at the remaining group of N-M electrode means at each location, and for accumulating a charge signal proportional to the amount of radiation sensed;

means for transferring, after the first integration time, the charge signals for one row accumulated in each pair of columns I and (I+1) to the (I+1)/2 register stage and for transferring to the (I+1)/2 register stage, after the second integration time, the charge signals for a second row accumulated in each pair of columns (I+1) and (I+2) said second row to be adjacent to said first row, when interlaced therewith, where I is an odd integer equal to 1, 3 . . . (Q−1); and means, after each transfer of a row of charge signals to said register, for sequentially shifting said signals out of said register.

10. In a charge transfer image sensing system which includes a photosensing array having Q columns of storage elements, a temporary storage array having the same number of columns of storage elements, and an output register connected to the columns of the temporary storage array, the improvement comprising:

said output register having a number of stages equal to a sub-multiple Q/N of the columns in said temporary storage array, where N is an integer equal to at least 2;

means during one time interval for shifting the contents of each I'th first group of N columns, into the I'th output register stage, where I=1, 2, 3 . . . Q/N; and means during another time interval for shifting the contents of each I'th second group of N columns, into the I'th output register stage, where each I'th first group has at least one column not in the I'th second group and at least one column which is in the I'th second group.

* * * * *